(12) United States Patent
Dudkowski (10) Patent No.: US 8,902,355 B2
(45) Date of Patent: Dec. 2, 2014

(54) PROMPTING SYSTEM

(76) Inventor: Edmond Louis Dudkowski, Sausalito, CA (US)

( * ) Notice: Subject to any disclaimer, the term of this patent is extended or adjusted under 35 U.S.C. 154(b) by 139 days.

(21) Appl. No.: 13/489,755

(22) Filed: Jun. 6, 2012

(65) Prior Publication Data

US 2013/0329112 A1    Dec. 12, 2013

(51) Int. Cl.
*H04N 5/225* (2006.01)
(52) U.S. Cl.
USPC .......................................... 348/373; 348/375
(58) Field of Classification Search
CPC ..... H04N 5/2251; H04N 5/222; H04N 9/646; H04N 5/2252
USPC ............. 348/375, 722, 373, 61, 14.01, 14.06, 348/14.08; 353/119, 122, 103, 113; 715/202; 396/1
See application file for complete search history.

(56) References Cited

U.S. PATENT DOCUMENTS

| | | | |
|---|---|---|---|
| 4,255,036 A * | 3/1981 | Pincetich | 396/422 |
| 4,591,250 A * | 5/1986 | Woodruff | 396/50 |
| 5,194,955 A * | 3/1993 | Yoneta et al. | 348/14.01 |
| 5,235,497 A * | 8/1993 | Costa | 362/224 |
| 5,666,153 A * | 9/1997 | Copeland | 348/14.1 |
| 5,721,586 A * | 2/1998 | Shimamura et al. | 348/61 |
| 6,104,424 A * | 8/2000 | McNelley | 348/14.16 |
| 6,542,297 B1 * | 4/2003 | Lee et al. | 359/466 |
| 6,717,619 B2 * | 4/2004 | Wasada | 348/375 |
| 6,980,253 B1 * | 12/2005 | Matsui | 348/375 |
| 2007/0166104 A1 * | 7/2007 | Face, III | 404/118 |
| 2009/0256970 A1 * | 10/2009 | Bilbrey et al. | 348/722 |
| 2010/0182513 A1 * | 7/2010 | DeOtte | 348/722 |
| 2010/0304329 A1 * | 12/2010 | Heo | 433/146 |
| 2013/0135528 A1 * | 5/2013 | Nicu | 348/552 |
| 2013/0292531 A1 * | 11/2013 | Schaefer et al. | 248/237 |
| 2013/0342073 A1 * | 12/2013 | Cutsforth et al. | 310/242 |

* cited by examiner

*Primary Examiner* — Nhan T Tran
*Assistant Examiner* — Chan Nguyen
(74) *Attorney, Agent, or Firm* — Leon E. Jew; Dahyee Law Group (57) ABSTRACT

This invention teaches a new generation of prompting system which allows an ordinary user to conveniently couple a LCD based prompting box to a video camera or a camcorder using a universal mounting and adjustment assembly by few steps which are as simple as loosening and fastening few fasteners.

20 Claims, 9 Drawing Sheets

PROMPTING SYSTEM

FIELD OF THE INVENTION

This invention generally relates to an autocue displaying device that prompts a person speaking with an electronic visual text of a speech or script. In particular, this invention relates to a prompting system which allows an ordinary user to conveniently couple a LCD based prompting box to a video camera or a camcorder by steps which are as simple as loosening and fastening few fasteners.

BACKGROUND OF THE INVENTION

Television camera mounted text prompters, commonly known as teleprompters, have been in use nearly since the advent of television. They enable on-camera talent to look directly into the hens of the camera and read a prepared script text that is generated by a computer software program that allows scrolling up of the text so the reader can keep up with the up-corning text as she reads aloud. The reader sees the text reflected from a two-way mirror and the audience can only sees the scene being shot by the camera through the mirror.

All such prompters evolved from the days of cathode ray TV tube displays. As a result, they were heavy off-camera devices that had to be mounted below the front of the camera on a "sled" between the camera and the camera pan and tilt head, which is then mounted on a tripod. Typically these prompters were heavy and time-consuming to mount and operate. Usually it takes a minimum of 30 minutes to set-up, align, balance and trim and connect to a personal computer.

With the availability of small size, low-cost and light-weight LCD displays; it is now possible to design and build a prompter that is lightweight, mounts in a more industry standard manner and is very quick to mount, set-up and use.

It is an object of the present invention to provide a simple, lightweight, compact yet effective prompting system that enables a speaker to look directing into a camera's lens which is hidden behind a prompting mirror and invisible to the speaker, and at the same time read the textual or other information shown on the prompting mirror, and that can be easily coupled with a video camera or a camcorder which has an accessory adapter shoe on its top.

It is a further object of the present invention to provide a prompting apparatus with a shrouded chamber immediately behind an inclined prompting mirror and the camera's lens is positioned in the chamber a id behind the mirror such that unwanted light is blocked from entering the camera's lens and the best quality of the recorded images by the camera can be reached.

It is a still further object of the present invention to provide a prompting apparatus with a flat display screen facing down to the prompting mirror, which is positioned at a 45 degree angle to the flat display screen, such that unwanted light from the light sources above the apparatus can be blocked from directly shining on the display screen.

It is an additional object of the present invention to provide a prompting apparatus with a housing in which the flat display screen is positioned as a ceiling facing down to the prompting mirror, which is positioned at a 45 degree angle to the flat display screen, such that the interference on the display screen and the prompting mirror caused by unwanted light is minimized and the clarity of the images on the prompting mirror viewed by the speaker is maximized.

It is yet another object of the present invention to provide a mounting and adjustment assembly which enables a user to couple the prompting apparatus to a video camera or a camcorder which has an accessory adapter shoe on its top.

SUMMARY OF THE INVENTION

The prompting system according to the present invention includes a LCD based prompter box and a universal mounting assembly to allow adjustment and mounting to most medium sized camcorders or video cameras.

The prompter box includes a see through mirror, a housing, and LCD display. The housing has an open front, two opposite shrouding walls, a shrouding bottom, and a rear shrouding wall. The see through mirror, which is approximately 40~60% reflective and 30~40% transparent, is securely held in position at a 45 degree angle to the screen surface of the LCD display. The rear shrouding wall has a round opening, or called through-hole, for placing the camera's lens.

The mounting assembly includes a flat mounting bracket, a first shaft, an elongate adjustment bracket, a sub-assembly including a second shaft with a rectangular or square flat base which is for coupling with an accessory adapter shoe on the camera's top. The flat mounting bracket is secured to the top of the LCD display unit by three or four mounting screws. The first shaft is a threaded mounting shaft being vertically screwed into the flat mounting bracket and tightened down by an internally threaded fastener such as a machine nut or a wing nut. The elongate adjustment bracket has a slot along its length direction. There is an internally threaded hole on one end of the elongate adjustment bracket. The elongate adjustment bracket is screwed onto the first shaft through the hole to the necessary vertical height. When the proper vertical height is realized to allow the center of the through-hole to be aligned with the camcorder's lens, the adjustment bracket is held in place by one or two internally threaded machine nuts which may be further tightened with a wrench, or by one or two wing nuts which can be tighten by hands.

The sub-assembly includes a second shaft with a rectangular or square flat base and fasteners. According to one preferred embodiment of the invention, the second shaft is a dual thread mounting shaft, having an upper portion with a first thread and a lower portion with a second thread. The second shaft is vertical to the rectangular or square flat base. The lower portion's diameter is larger than the upper portion's diameter. A first fastener, such as an internally threaded machine nut or a wing nut, is screwed onto the upper portion of the second mounting shaft after the upper portion is inserted into the slot on the elongate adjustment bracket. The first fastener is used to secure the second shaft to the elongate adjustment bracket after the distance between the second shaft and the first shaft is adjusted. After the flat base is inserted into the accessory adapter shoe which is available on all modern camcorders or video cameras, the second shaft can be secured to the camcorder by screwing down a second fastener, such as a machine nut or a wing nut, along the second thread. Preferably, a washer is placed over the second fastener. The washer's inner diameter is slightly larger than the second shaft's upper portion's diameter but less than its lower portion's diameter such that the washer can be blocked by the lower portion. In operation, the second shaft's upper portion is inserted into the slot on the elongate adjustment bracket and moved horizontally in the slot until the accessory bracket is aligned with the video camera's accessory adapter shoe. The first fastener is then fastened to the upper end of the second shaft's upper portion. Then, the flat base is inserted into the video camera's accessory adapter shoe on its top. By screwing down the second fastener toward the flat base, the second shaft is secured to the video camera. Accordingly, the prompt box is securely coupled to the video camera.

The back of the prompter's housing has a plastic cover which is held in place by a hook and loop fastener on its' back to provide a light shield for anyone viewing the mirror glass reflecting the prompter information displayed on the screen of the LCD display unit. One side of the prompter box shows a hardware interface, including but not limited to the DC power input required to provide DC power to the LCD display unit, USB input and other electronic connectors. In a typical embodiment, a VGA signal is applied to the LCD display through a connector on the side of the prompter unit. Ventilation holes on the top side of the LCD display unit provide air-flow ventilation to the LCD unit.

BRIEF DESCRIPTION OF THE DRAWINGS

FIGS. 8 (a), 8(b), 8(c) and 8(d) are schematic diagrams illustrating a top view, a bottom view, a side view and a cross-sectional view, respectively, of a fastener used to secure a dual screw thread mounting shaft to an elongate adjustment bracket according to a typical embodiment of the invention;

FIGS. 9 (a), 9(b), 9(c) and 9(d) are schematic diagrams illustrating a top view, a bottom view, a side view and a cross-sectional view, respectively, of a fastener used to secure an accessory coupling bracket to a video camera's accessory adapter shoe according to a typical embodiment of the invention;

FIGS. 10 (a), 10(b) and 10 (c) are schematic diagrams illustrating a bottom view, a top view and a side view, respectively, of a dual screw thread mounting shaft according to a typical embodiment of the invention.

DETAILED DESCRIPTION OF THE INVENTION

While the present invention may be embodied in many different shapes, forms, designs or configurations, for the purpose of promoting an understanding of the principles of the invention, reference will be made to the embodiments illustrated in the drawings and specific language will be used to describe the same. It will nevertheless be understood that no limitation of the scope of the invention is thereby intended. Any alterations and further implementations of the principle, the essence or the spirit of the invention as described herein are contemplated as would normally occur to one skilled in the art to which the invention relates.

Figure 1:
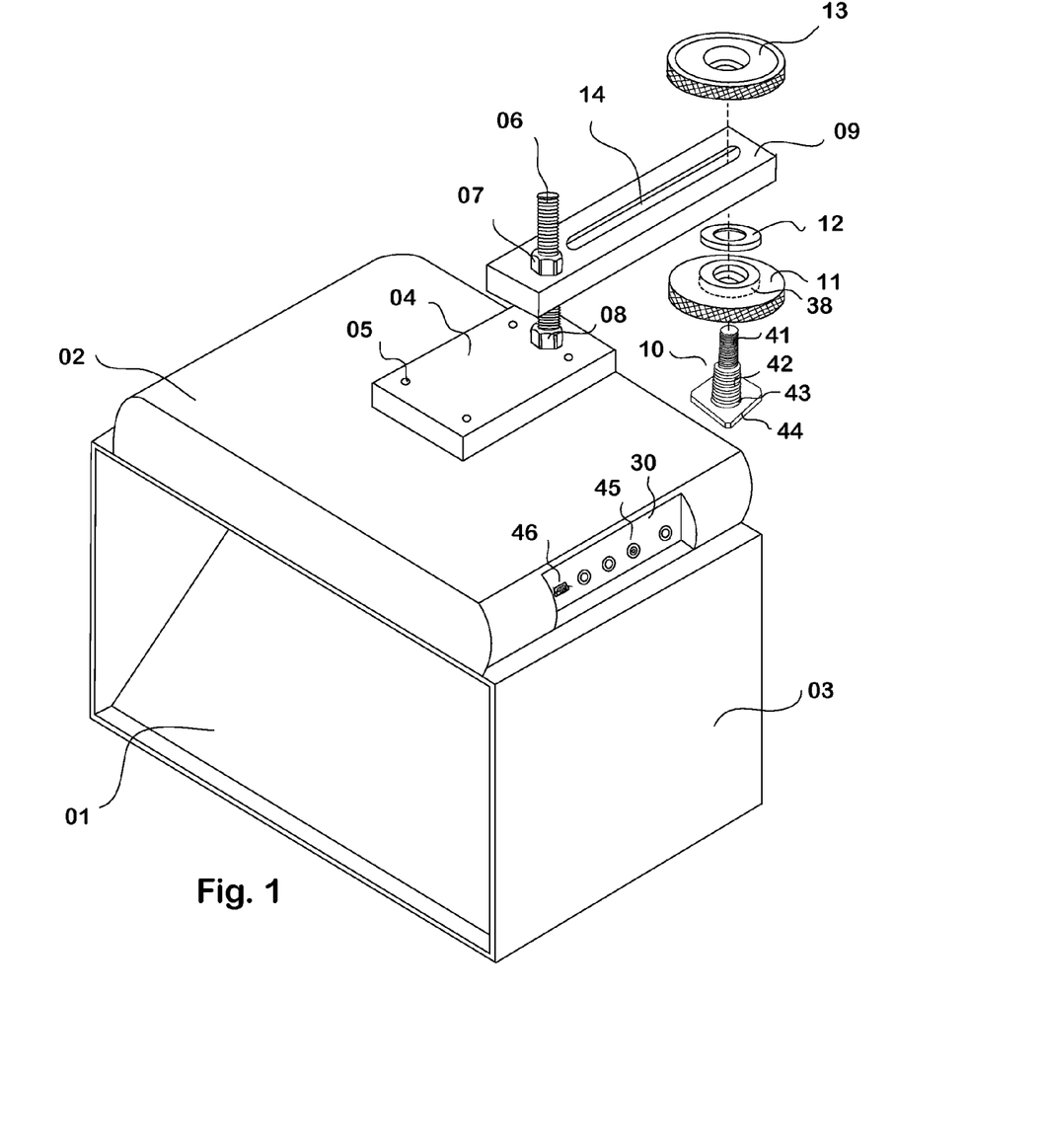
FIG. 1 is a schematic diagram illustrating a perspective view of a typical embodiment of the prompting system according to the present invention which includes a prompting box and a mounting and adjusting assembly coupled thereto.
Figure 2:
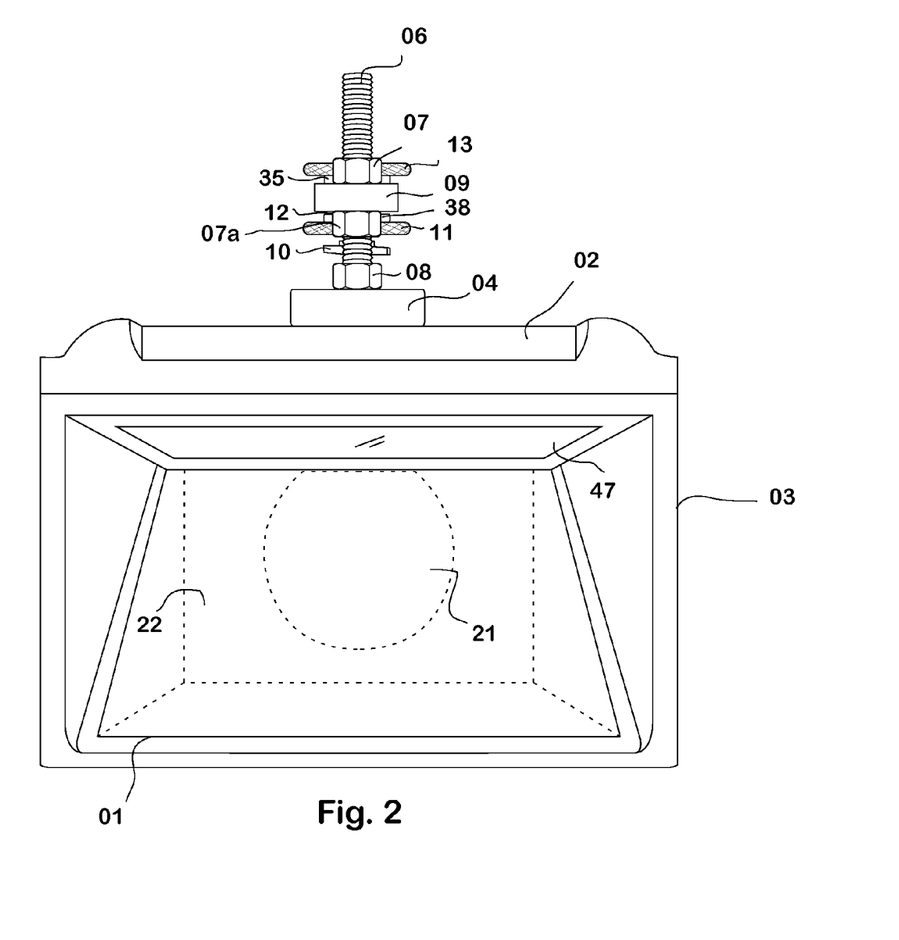
FIG. 2 is a schematic diagram illustrating a front view of the prompting system according to FIG. 1.

FIG. 1 is a diagram illustrating a perspective view of a typical embodiment of the prompting system according to the present invention. The system includes a prompter unit and a mounting and adjusting assembly for coupling the prompter unit to a video camera or a camcorder, herein after referred to as a camera, which has an accessory adapter shoe, usually called accessory shoe, on its top. The prompter unit, also called prompting box, includes an inclined two-way mirror 01, a case 03, and a displaying unit 02 which is coupled to the upper side of the case 03. The displaying unit 02 has an LCD based flat screen which faces down toward the inner space of the case 03 such that the optical image on the flat LCD screen is shown on the two-way mirror 01 and then reflected to the eyes of a speaker who looks into the mirror.

The inclined two-way mirror 01 is a see-through mirror with an optical grade of approximately 60~70% reflective and approximately 30~40% transparent. The two-way mirror 01 is held in position at a 45 degree angle to the flat LCD screen of the displaying unit 02. The reflective surface of the mirror faces outward such that the speaker in front of the prompter box can read the textual image reflected from the flat LCD screen. The camera's lens is placed in the back of the mirror 01 but it is invisible to the speaker. Because the mirror is 30~40% transparent, the speaker's image can be caught by the lens and then recorded by the recording device attached to the camera. For the best recording quality, the lens' front surface is approximately at a 45 degree angle to the inclined mirror 01.

Figure 3:
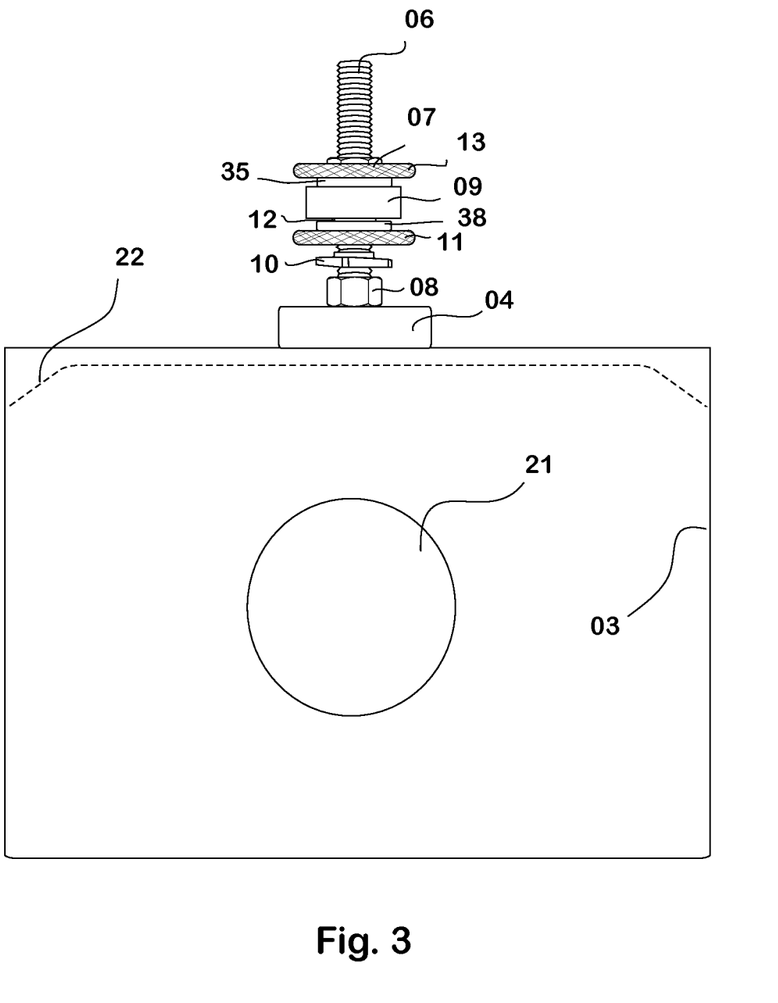
FIG. 3 is a schematic diagram illustrating a rear view of the prompting system according to FIG. 1.

The case 03 is also called the housing for the mirror 01 and for the camera's lens. It can be a molded plastic case, a metal case, an assembled unit of several pieces, or a foldable and collapsible structure for carrying and storing convenience. In a typical configuration, as shown in FIG. 1 through FIG. 7, the case 03 is in a shape of cube or rectangular cuboid and has two opposite side walls paralleling to each other, a bottom side perpendicular to the side malls, an open front and a rear wall 22. The flat LCD screen 47 of the displaying unit 02 is coupled to the top and constitutes the top side, i.e. the ceiling, of the case 03. The inclined mirror 01 is in a square or a rectangular shape with a width which is substantially identical to the inner distance between the two opposite side walls. The mirror 01 is fixed to the side walls of the case 03 using the existing art such as by inserting the mirror into two paralleling symmetric grooves embedded in the inner sides of the two opposite side walls. The upper edge of the inclined mirror 01 is affixed to the upper back side of the case 03, and its lower edge is affixed to the front edge of the bottom side. Preferably, the upper edge of the inclined mirror 01 is fixed to the rear edge of the flat LCD screen 47. Referring to FIG. 3, which is a rear view of the prompter box, the rear wall 22 of the case 03 has a round opening 21, also called a through-hole, through which the cameras lens is inserted, positioned and aligned. The inclined mirror 01, the two opposite side walls of the case 03, the rear wall 22 of the case 03, and the flat LCD screen 47 of the displaying unit 02 forms an inner chamber where the camera's lens resides. To block unwanted lights into the chamber, a flexible elastic collar or sleeve can be operatively attached around the round opening 21. After the lens is inserted into the inner chamber through the opening 21, the sleeve is internally attached to or locked on the camera, such that unwanted lights cannot enter the chamber from the gap between the round opening 21 and the camera.

The case 03 provides a framework to support the flat LCD screen 47, to hold the inclined mirror 01 in a proper position, to prevent unwanted lights from shedding on the inclined mirror 01, and to prevent unwanted lights from shedding on the camera's lens which is placed in the inner chamber and behind the inclined mirror 01.

Figure 6:
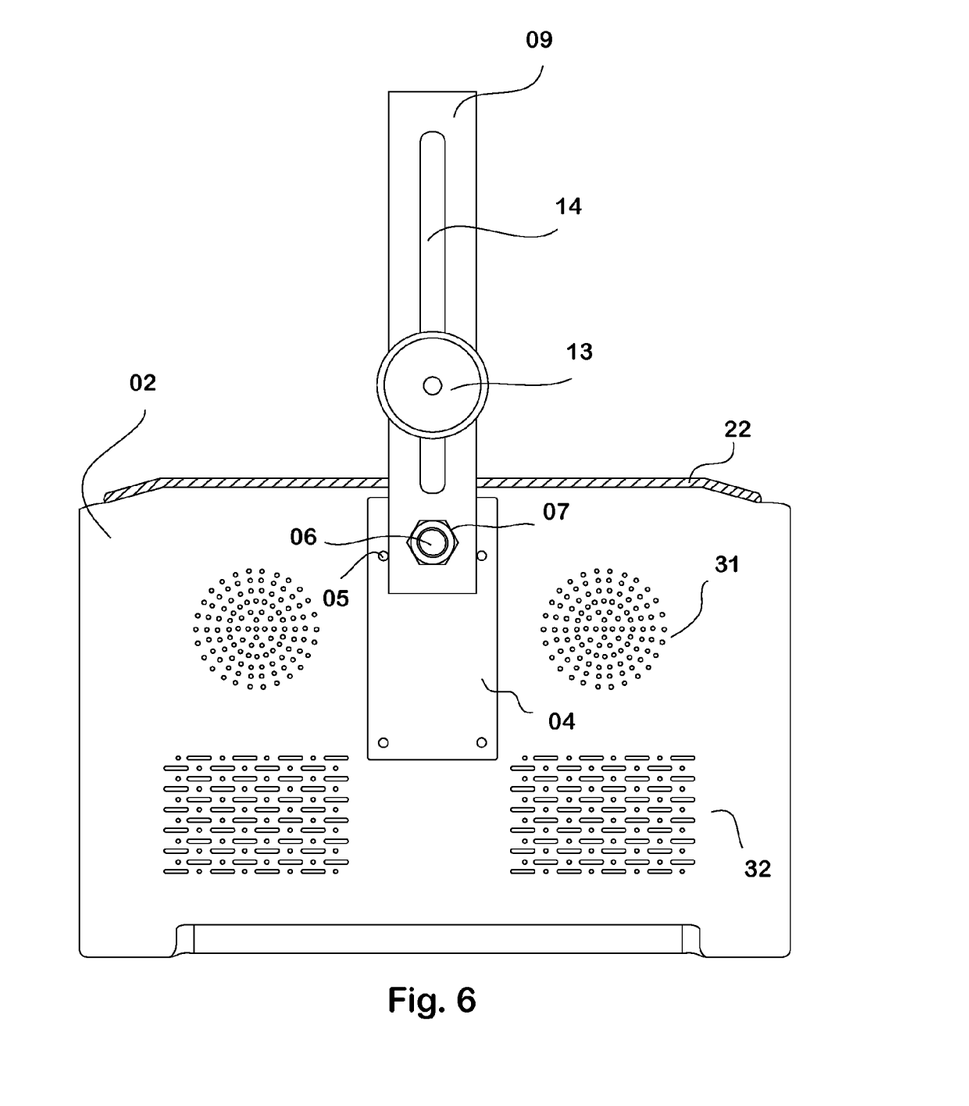
FIG. 6 is a schematic diagram illustrating a top view of the prompting system according to FIG. 1.
Figure 7:
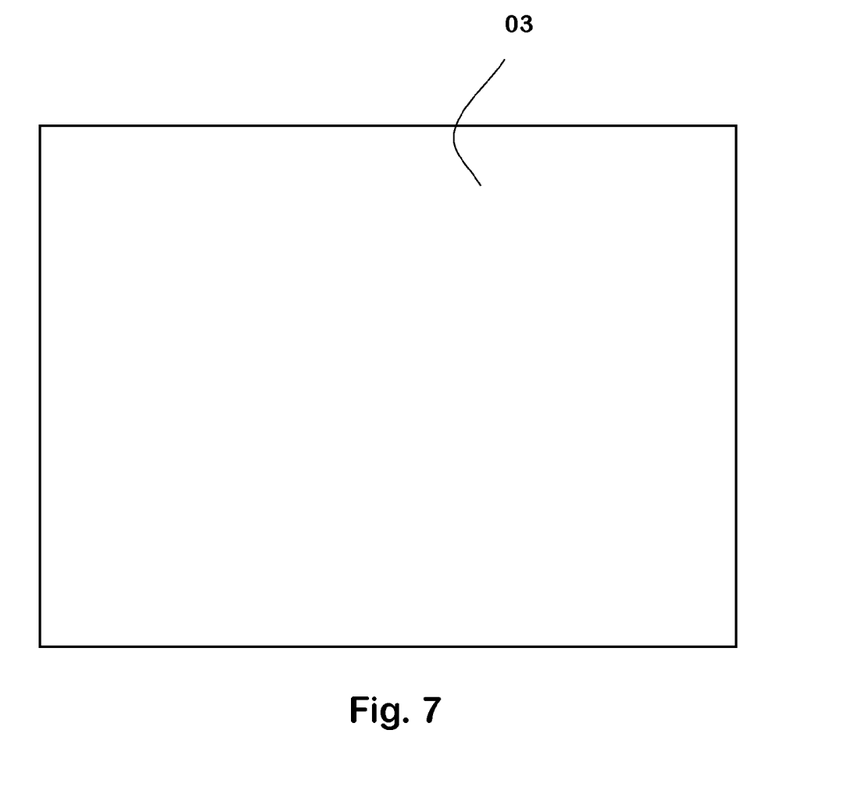
FIG. 7 is a schematic diagram illustrating a bottom view of the prompting system according to FIG. 1.

Referring back to FIG. 1, the top or the back of the display unit 02 is mechanically coupled to a mounting and adjusting assembly of hardware. The hardware assembly includes: (1) a flat mounting bracket 04 which is secured to the top side of the display unit 02 by a securing means such as by three or four mounting screws 05 as illustrated in FIG. 1 and FIG. 6; (2) a threaded shaft 06 which is vertically coupled to the flat mounting bracket 04 by a securing means such as by screwing the shaft 06 into the flat mounting bracket 04 and being tightened down by a fastener such as a machine nut 08, which can be a wing nut; (3) an elongate adjustment bracket 09 which is screwed onto the threaded shaft 06 to a necessary vertical height and held in place by two fasteners such as machine nuts 07 and 07a, which can be wing nuts; (4) a sub-assembly including a dual screw thread mounting bracket 10 which is slidably coupled to the elongate adjustment bracket 09 through a slot 14, a washer 12 which is placed over a first thread 41 on the upper portion of the mounting bracket 10, an internally threaded fastener 13 for securing the bracket 10 on the adjustment bracket 09, a flat rectangular or square base 44, and another internally threaded fastener 11 coupled to a second thread 42 on the lower portion of the mounting bracket 10 for securing the flat base 44 to a camera's accessory adapter shoe.

Figure 4:
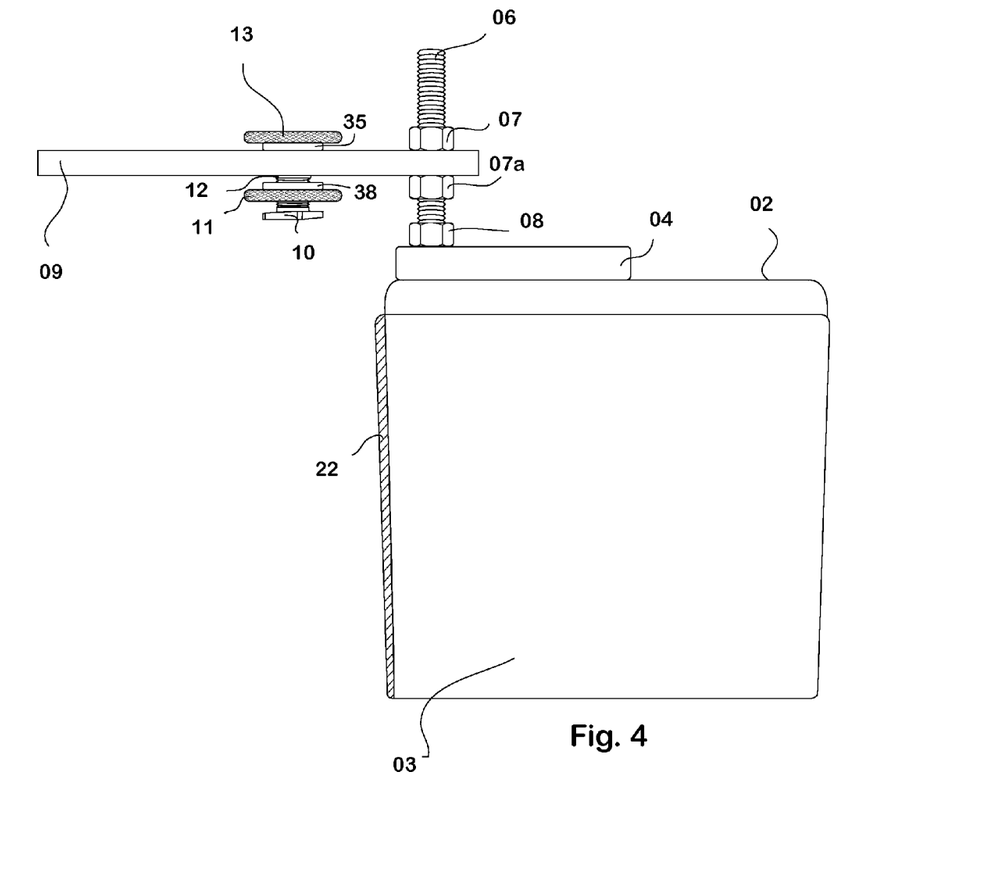
FIG. 4 is a schematic diagram illustrating a left side view of the prompting system according to FIG. 1.
Figure 5:
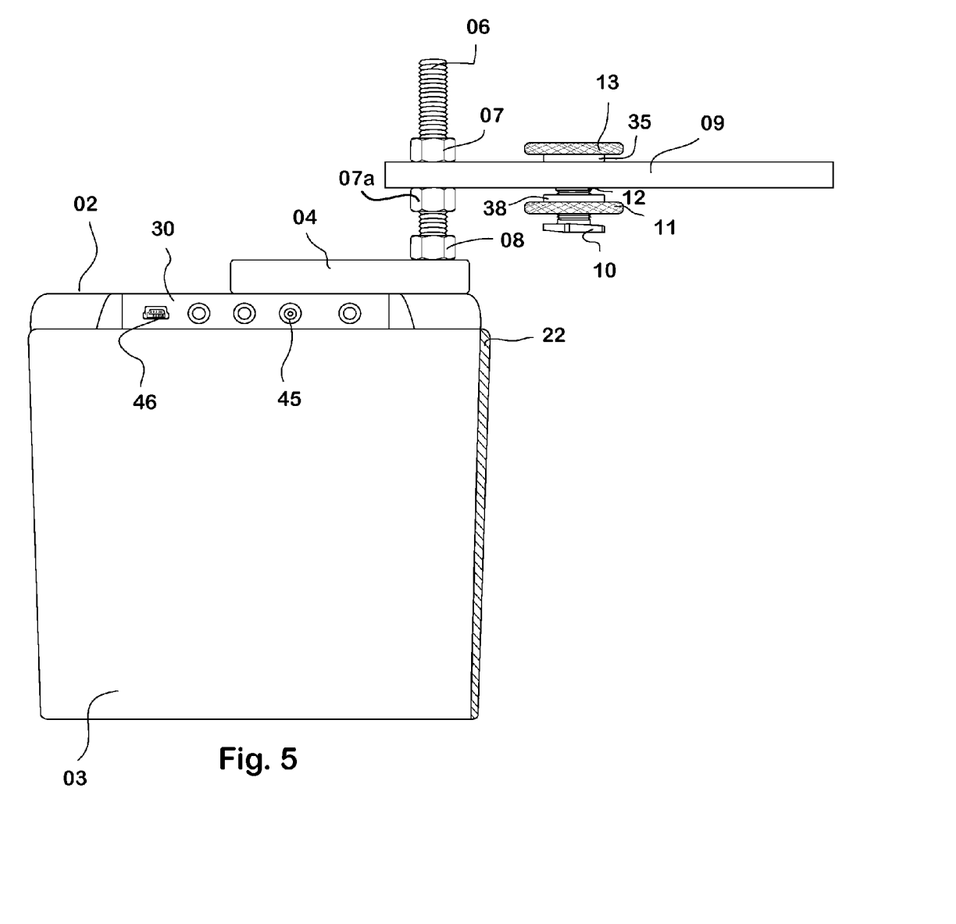
FIG. 5 is a schematic diagram illustrating a right side view of the prompting system according to FIG. 1.
Figure 8:
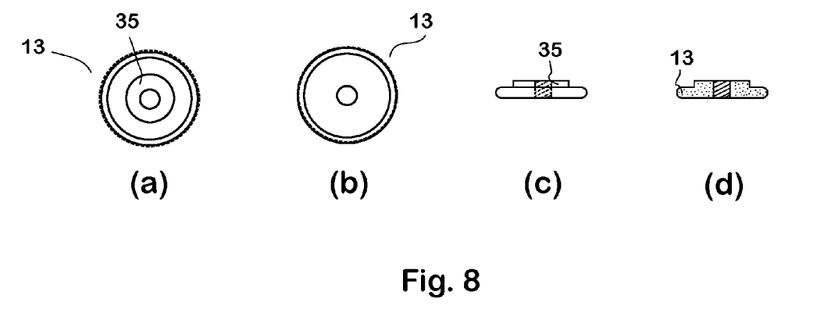
Figure 9:
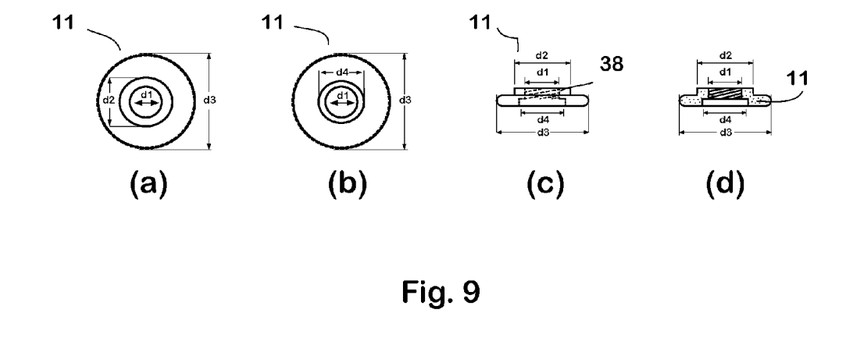

The internal thread of the fastener 13 matches with the first thread 41. The internal thread of the fastener 11 matches with the second thread 42. In the typical embodiment, the external diameter of the second thread 42 is larger than the external diameter of the first thread 41. The internal diameter of the washer 12 is slightly larger than the external diameter of the first thread 41 such that the washer can be easily slide over the first thread 41, and is smaller than the external diameter of the second thread 42 such that the lower portion of the bracket 10 blocks the washer 12. When the fastener 11 is screwed down against the flat base 44, it secures the flat base 44 to the camera's accessory adapter shoe. When the fastener 13 is screwed down against the washer 12, it secures the mounting bracket 10 to the adjustment bracket 09. To strengthen the coupling with the flat base 44, the fastener 11 may have an internal cup structure with a diameter d4 as shown in FIGS. 9(b), 9(c) and 9(d). Further, the fastener 13 may have a convex member on one side for a better coupling, as shown in FIG. 4, FIG. 5 and FIG. 8. Similarly, the fastener 11 may have a convex member 38 on one side, as shown in FIG. 1, FIG. 4, FIG. 5 and FIG. 9.

Figure 10:
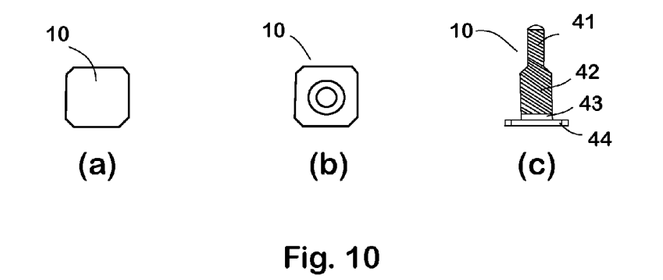
Figure 11:
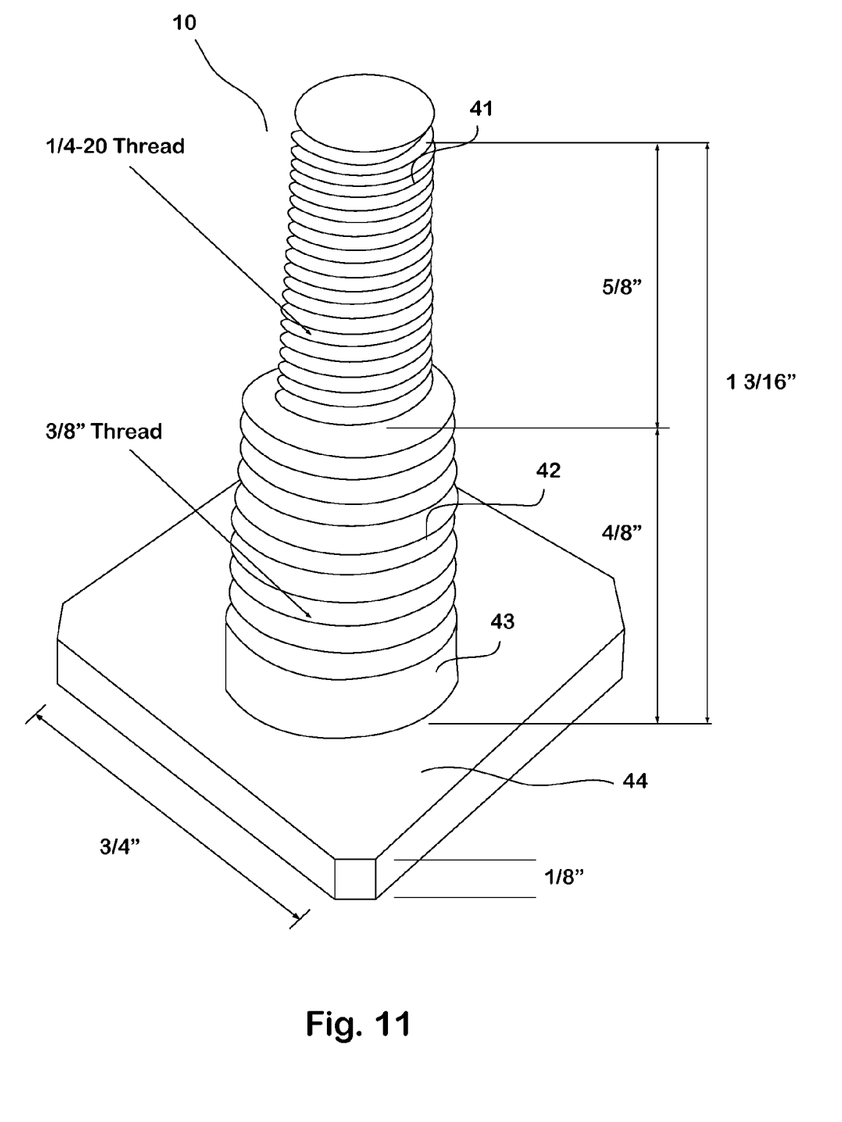
FIG. 11 is a schematic perspective diagram illustrating the dual screw thread mounting shaft according to a typical embodiment of the invention.

Referring to FIG. 11, which is a schematic perspective view of the dual screw thread mounting bracket 10 for the sub-assembly discussed above. The dual screw thread mounting bracket 10 includes a flat base 44 at its bottom and a threaded shaft vertical to the flat base 44. The flat base 44 is preferably in a rectangular shape for convenient coupling with the camera's accessory adapter shoe. The shaft includes a first thread 41 in its upper portion, a second thread 42 in its lower portion and a non-threaded end 43 between the second thread 42 and the flat base 44. FIG. 10(a), FIG. 10(b) and FIG. 10(c) illustrate a bottom view, a top view and a side view of the mounting bracket 10 respectively. In a typical embodiment of the invention, the first thread 41 is a ¼-20 thread and the second thread 42 is a ⅜"-16 thread. The width and thickness of the flat base 44 are ¾" and ⅛" respectively.

In operation, the internally threaded fastener 11, which is a machine rut or a wing nut, is screwed onto the second thread 42 of the mounting bracket 10. FIG. 9(a), FIG. 9(b), FIG. 9(c) and FIG. 9(d) illustrate a top view, a bottom view, a side view, and cross-sectional view of the fastener 11 respectively. The flat base 44 is inserted into the accessory adapter shoe on the top of the camera. By screwing down the fastener 11, the mounting bracket 10 is secured to the camera. By sliding the mounting bracket 10 along the slot 14 on the adjustment bracket 09, the camera's lens is horizontally adjusted for a most appropriate position. After the lens' horizontal position is determined, the mounting bracket 10 can be secured to the adjustment bracket 09 by screwing down the internally threaded fastener 13, which can be a machine nut or a wing nut. FIG. 8(a), FIG. 8(b), FIG. 8(c) and FIG. 8(d) illustrate, respectively, a top view, a bottom view, a side view, and cross-sectional view of a machine nut 13 used as a fastener.

Referring to FIG. 1, FIG. 4, FIG. 5 and FIG. 11, the elongate adjustment bracket 09 can range in thickness from ⅛" to ⅜", depending on the materials used. The slot 14 is an elongate open space which allows the mounting bracket 10 to slide horizontally. The external diameter of the first thread 41 of the mounting bracket 10 is slightly smaller than the width, i.e., the narrower measurement, of the slot 14 such that the mounting bracket 10 can be moved horizontally in the slot 14 until the flat base 44 is properly aligned with the camera's accessory adapter shoe and held in position by the internally threaded fastener 11.

For the designed operational purpose, the elongate adjustment bracket 09 is parelleled to the flat mounting bracket 04, and is perpendicular to the mounting shaft 06 and the mounting bracket 10.

FIG. 3 illustrates the rear view of the prompting system. The rear wall or back cover 22 of the prompter unit can be a detachable plastic board according to one typical implementation of this invention. The back cover 22 can be held in place by a hook and loop fastener (not shown). In another implementation, the back cover 22 can be affixed to the two opposite side walls and the bottom side permanently. To block unwanted lights from entering the inner chamber described above, a flexible or elastic sleeve or lining (not shown) is affixed around the edge of the opening 21.

To avoid unwanted light reflection, the inner sides of the prompter's case, i.e. inner sides of the opposite walls, the inner side of the bottom and the inner side of the rear wall or back cover are coated or lined with an anti-reflection layer.

The hardware mounting and adjustment assembly described above can be further modified in several aspects without changing the spirit and scope of this invention. First, the flat mounting bracket can be embedded in or integrated with the backbone of the display unit such that a user just needs to screw a first threaded shaft, i.e. the mounting shaft 06, into an internally threaded hole on the back of the display unit and secure it by a first fastener. Second, the elongate adjustment bracket 09 is screwed onto the mounting shaft 06 and then secured by a single fastener, called the second fastener. Three, the sub-assembly of the mounting bracket 10 includes a second threaded shaft, a flat rectangular or square base and three fasteners—after the second threaded shaft is inserted into the slot 14, it is secured by a third fastener above the slot 14 and a fourth fastener below the slot 14, and a fifth fastener is used for securing the second threaded shaft to the camera's accessory adapter shoe. Four, to further reduce the manufacturing cost, the first threaded shaft and the second threaded shaft have the same helical properties and the five fasteners mentioned in this paragraph can be identical. Optionally, five identical washers can be used with the five identical fasteners.

Referring back to FIG. 1 and FIG. 5, the electrical interface such as the DC power input 45 and a signal input 46 can be configured in a panel 30 on one side of the displaying unit 02.

The signal generated from a PDA, a tablet, a laptop or a desktop PC is applied to the LCD displaying unit through the signal input 46. The inverted textual image is shown on the flat LCD screen. Upon reflection, the speaker in front of the prompter can read the textual image in its normal format. On the top of the displaying unit 02, the ventilation holes 31 and 32 as shown in FIG. 6 provide air-flow ventilation to the LCD display unit.

In another preferred embodiment of the invention, the displaying unit 02 can be a lightweight computing device with an incorporated processor and an LCD based display screen, forming a compact self-contained unit, such as but not limited to a notebook, a tablet, an iPad or iPod, a smart mobile phone. The unit runs a prompting software application and the pre-designed prompting text or other information is displayed on the display screen at a speed that the speaker feels comfortable to read. The unit may have a wireless remote control function which enables the speaker to adjust the moving speed of the script or images on the mirror.

Yet, in another preferred embodiment of the invention, the displaying unit 02 can be a mobile phone or other type of electronic device which has an LCD display. The prompter's housing includes a frame and a coupling means, such an insert-and-lock means, which enables a user to insert or slide in a tablet device to fulfill the functions of the display unit described above. The tablet device runs a prompting software application and the pre-designed text or other message is displayed on the LCD screen at a speed that the speaker feels comfortable to read.

While one or more embodiments of the present invention have been illustrated above, the skilled artisan will appreciate that modifications and adoptions to those embodiments may be made without departing from the scope and spirit of the present invention.

What is claimed is:

1. A prompting apparatus for coupling with a camera for video recording which has an accessory adapter shoe on its top, comprising:
   a rectangular cuboid housing with an open front defined by two opposite side walls, a bottom side, a top side, and a rear wall with a round opening for positioning and aligning said camera's lens;
   a flat see-through mirror placed in said housing with its upper edge attached to said top side's rear edge, its lower edge attached to said bottom side's front edge, and its two side edges attached to said two opposite side walls respectively such that said mirror and said housing forming a chamber where said lens is positioned and aligned behind said mirror; and
   a mounting and adjusting hardware assembly for coupling said housing with said camera through said accessory adapter shoe;
   wherein said top side is a display unit with a flat facing-down LCD screen being at an angle of approximately 45 degrees from said mirror and in operation, image on said screen is reflected by said mirror to a speaker's eyes seeing into said mirror while light from said speaker passes through said mirror into said lens; and
   wherein said hardware assembly comprising a flat mounting bracket which is secured to said display unit's top, a shaft vertically coupled to said flat mounting bracket, a single piece elongate adjustment bracket being operatively coupled with said shaft, a vertical distance away from said flat mounting bracket to allow the center of the round opening to be aligned with a camera lens, and an upright bracket with its bottom end being operatively coupled and secured to said accessory adapter shoe and with its top end operatively coupled with said elongate adjustment bracket for adjusting a horizontal distance from said shaft to said upright bracket.

2. The prompting apparatus of claim 1, further comprising an elastic sleeve element is coupled around and between said round opening that separates from the housing, such that the sleeve element may be attached to the camera after it has been placed through the round opening.

3. The prompting apparatus of claim 1, wherein inner surfaces of said two opposite side walls, said bottom side and said rear wall are coated with anti-reflection materials to prevent unwanted lights from reflecting into said mirror and said lens.

4. The prompting apparatus of claim 1, wherein said flat mounting bracket is secured to said display unit's top by at least three mounting screws.

5. The prompting apparatus of claim 1, wherein said shaft is integrated with and is vertical to said flat mounting bracket.

6. The prompting apparatus of claim 1, wherein
   said shaft is threaded, and
   said single piece elongate adjustment bracket is operatively screwed onto said shaft through an internally threaded hole on one end of said elongate adjustment bracket.

7. The prompting apparatus of claim 1, wherein the upright bracket comprises a dual thread shaft member and the elongate adjustment bracket comprises an elongated slot, such that the mounting bracket slidably couples to the elongated adjustment bracket through the elongated slot.

8. The prompting apparatus of claim 1, wherein
   said elongate adjustment bracket has a slot along the majority of its elongation direction;
   wherein said upright bracket comprises an upper portion with a first external thread, a lower portion with a second external thread and a flat base; and
   wherein said upright bracket is operatively coupled with said elongate adjustment bracket by inserting said upper portion through said slot and securing said upper portion with a third internally threaded fastener being screwed onto said first external thread.

9. The prompting apparatus of claim 8, wherein said upright bracket is operatively coupled with said accessory adapter by inserting said flat base into said accessory adapter shoe and securing said flat base to said accessory adapter shoe with a fourth internally threaded fastener being screwed onto said second external thread.

10. The prompting apparatus of claim 9, wherein said fourth internally threaded fastener's diameter is larger than said third internally threaded fastener's diameter.

11. The prompting apparatus of claim 9, wherein
   said upper portion and said lower portion have identical threads, and
   wherein said third internally threaded fastener and said fourth internally threaded fastener are identical.

12. The prompting apparatus of claim 9, wherein
   a washer is placed between said elongate adjustment bracket and said lower portion; and wherein said lower portion's diameter is larger than said washer's diameter.

13. The prompting apparatus of claim 1, wherein
   said display unit comprises a mobile phone device having a flat display screen, said mobile phone being capable of running a prompt software application.

14. The prompting apparatus of claim 13, further comprising a wireless remote control device which enables said speaker to control displaying speed of images on said display screen.

15. The prompting apparatus of claim 1, wherein the display unit and all of its components are adapted to be inserted inside the housing.

16. The prompting apparatus of claim 1, wherein the housing further includes a frame for sliding a mobile device into the housing.

17. A prompting apparatus for coupling with a video camera which has an accessory shoe on its top, comprising:
- a rectangular cuboid housing with an open front defined by two opposite side walls, a bottom side, a top side, and a rear wall with a round opening for positioning and aligning said camera's lens;
- a flat see-through mirror being placed in said housing with its upper edge being attached to said top side's rear edge, its lower edge being attached to said bottom side's front edge, and its two side edges being attached to said two opposite side walls respectively such that said mirror and said housing forming a chamber where said lens is positioned and aligned behind said mirror;
- and a mounting and adjusting hardware assembly for coupling said housing with said camera through said accessory shoe;
- wherein said top side is a display unit with a flat facing-down LCD screen being at an angle of approximately 45 degrees from said mirror and in operation;
- image on said screen is reflected by said mirror to a speaker's eyes seeing into said mirror while light from said speaker passes through said mirror into said lens;
- wherein an elastic sleeve is coupled around and between said round opening and said camera to prevent unwanted lights from entering said chamber;
- wherein inner surfaces of said two opposite side walls, said bottom side and said rear wall are coated with an anti-reflection layer to prevent unwanted lights from reflecting into said mirror and said lens;
- wherein said hardware assembly comprising a flat mounting bracket which is embedded in said display unit's top, a first threaded shaft being vertically coupled to said flat mounting bracket, an elongate adjustment bracket with an internally threaded hole being screwed unto said first threaded shaft to a necessary vertical height and held in place by a first internally threaded fastener, and a second threaded shaft having a flat rectangular base which is to be operatively inserted into said accessory shoe and secured by a second internally threaded fastener, said second threaded shaft's upper end being slidably coupled with said elongate adjustment bracket along an elongate slot on said elongate adjustment bracket's elongation direction for adjusting a horizontal distance from said first threaded shaft to said second threaded shaft, and said second threaded shaft being secured by a third internally threaded fastener above said elongate adjustment bracket and by a fourth internally threaded fastener under said elongate adjustment bracket.

18. The prompting apparatus of claim 17, wherein said first shaft's thread and said second shaft's thread have same helical properties, and wherein said first shaft has a different diameter than said second shaft's diameter.

19. A prompting apparatus for coupling with a video camera which has an accessory shoe on its top, comprising:
- a rectangular cuboid housing with an open front defined by two opposite side walls, a bottom side, a top side, and a rear wall with a round opening for positioning and aligning said camera's lens;
- a flat see-through mirror being placed in said housing with its upper edge being affixed to said top side's rear edge, its lower edge being affixed to said bottom side's front edge, and its two side edges being affixed to said two opposite side walls respectively such that said mirror and said housing forming a chamber where said lens is positioned and aligned behind said mirror;
- and a mounting and adjusting hardware assembly for coupling said housing with said camera through said accessory shoe;
- wherein said top side is formed by a computing device with a flat display screen being facing down at an angle of approximately 45 degrees from said mirror, said computing device being capable to run a prompting software application and display prompting images on said screen, said prompting images being reflected by said mirror to a speaker's eyes seeing into said mirror while light from said speaker passing through said mirror into said lens;
- wherein an elastic sleeve is coupled around and between said round opening and said camera to prevent unwanted lights from entering said chamber;
- wherein inner surfaces of said two opposite side walls, said bottom side and said rear wall are all coated with an anti-reflection layer to prevent unwanted lights from reflecting into said mirror and said lens;
- wherein said hardware assembly comprising a first threaded shaft being vertically coupled to a flat mounting bracket embedded in said computing device's backbone, an elongate adjustment bracket with an internally threaded hole being screwed unto said first threaded shaft to a necessary vertical height and held in place by a first internally threaded fastener, and a second threaded shaft having a flat rectangular base which is to be operatively inserted into said accessory shoe and secured by a second internally threaded fastener, said second threaded shaft's upper end being slidably coupled with said elongate adjustment bracket along an elongate slot on said elongate adjustment bracket's elongation direction for adjusting a horizontal distance from said first threaded shaft to said second threaded shaft, and said second threaded shaft being secured by a third internally threaded fastener above said elongate adjustment bracket and by a support means under said elongate adjustment bracket, said support means being any of: a fourth internally threaded fastener or a washer and a block.

20. The prompting apparatus of claim 19, wherein said first shaft's thread and said second shaft's thread have same helical properties, wherein said first shaft has a different diameter than said second shaft's diameter.

* * * * *